United States Patent [19]

Rucktenwald

[11] Patent Number: 4,751,734

[45] Date of Patent: Jun. 14, 1988

[54] RECEIVER FOR FM STEREOPHONIC BROADCASTING SYSTEM UTILIZING CIRCUITS FOR REDUCING EFFECTS OF MULTIPATH

[75] Inventor: Thomas E. Rucktenwald, Sandy Hook, Conn.

[73] Assignee: Broadcast Technology Partners, Bloomfield Hills, Mich.

[21] Appl. No.: 56,014

[22] Filed: Jun. 1, 1987

[51] Int. Cl.⁴ ............................................. H04H 5/00
[52] U.S. Cl. ..................................................... 381/13
[58] Field of Search ................... 381/2, 3, 4, 10, 11, 381/13, 14, 106; 333/14

[56] References Cited

U.S. PATENT DOCUMENTS

| | | | |
|---|---|---|---|
| 4,388,493 | 6/1983 | Maisel | 179/1 GD |
| 4,485,483 | 5/1984 | Torick et al. | 381/14 |
| 4,534,054 | 8/1985 | Maisel | 381/4 |
| 4,602,380 | 7/1986 | Stebbings | 381/13 |
| 4,602,381 | 7/1986 | Cugini et al. | 381/13 |

Primary Examiner—Forester W. Isen
Attorney, Agent, or Firm—Spencer E. Olson

[57] ABSTRACT

To counter the effects of multipath on the signal received at the receiver of an FM stereophonic broadcasting system utilizing companding of the stereo difference signal, the normal operation of the expander embodied in the receiver is automatically modified in response to detection of multipath so as to minimize such effects and thereby improve the quality of the reproduced signal. In the preferred embodiment, a substantially fixed or steady control voltage replaces the normal dynamically varying control signal for the variable gain element of the expander during occurrences of multipath disturbances in excess of a predetermined severity. Another aspect of this embodiment is that a D.C. correction voltage having an amplitude proportional to the severity of the detected disturbances is combined with the fixed control voltage for the variable gain element in a manner to reduce the gain of the element thereby to further reduce the effect of the disturbance.

11 Claims, 2 Drawing Sheets

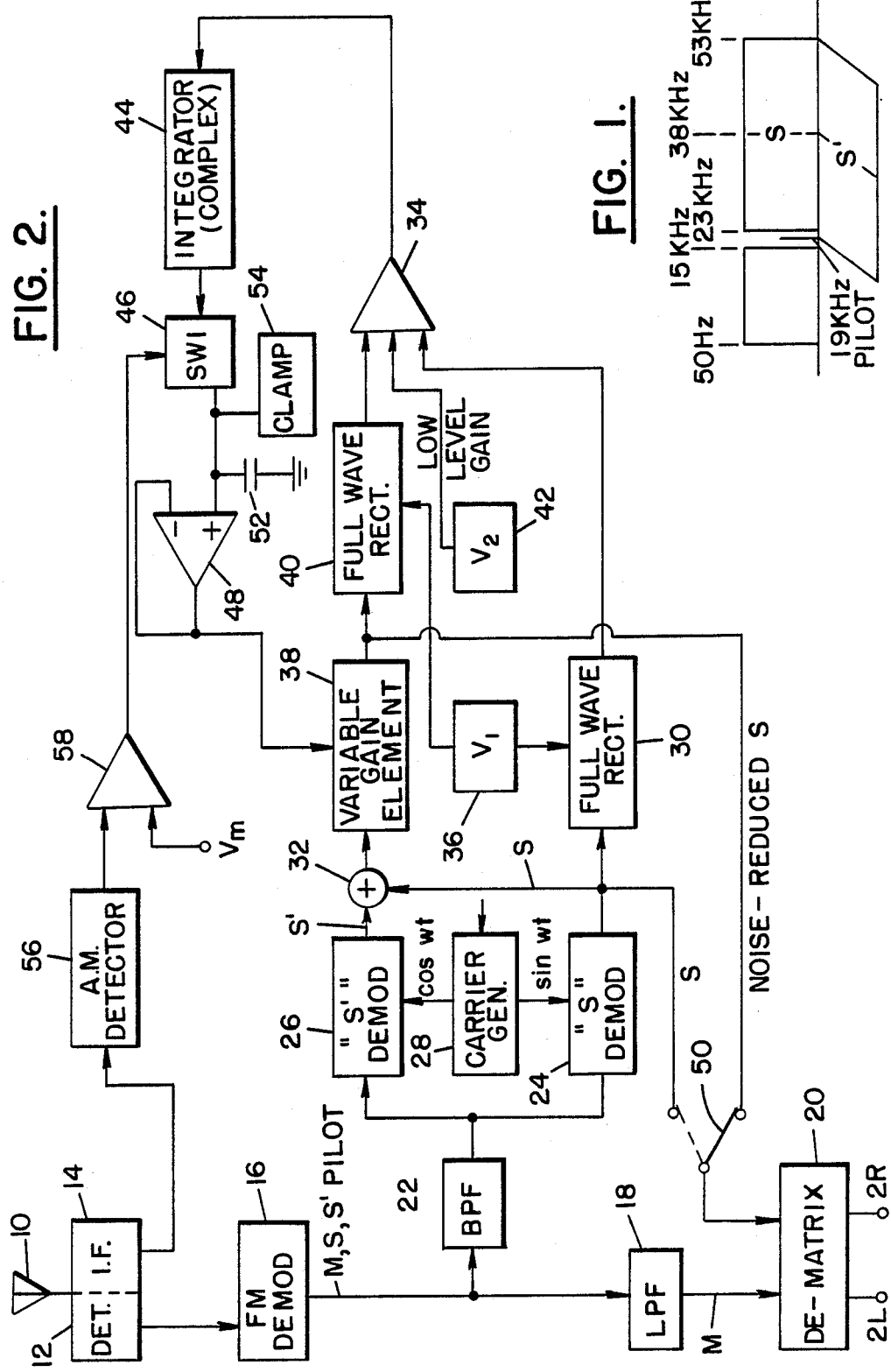

RECEIVER FOR FM STEREOPHONIC BROADCASTING SYSTEM UTILIZING CIRCUITS FOR REDUCING EFFECTS OF MULTIPATH

BACKGROUND OF THE INVENTION

This invention relates to FM stereophonic broadcasting systems and, more particularly, to a receiver for an FM stereophonic broadcasting system which increases the broadcast coverage area over that of current biphonic service which utilizes circuits for reducing the effects of multipath on the received signal.

U.S. Pat. No. 4,485,483 describes a stereophonic broadcasting system incorporating companding of the difference signal which is compatible with existing receivers and which through signal-to-noise improvement significantly extends the area of coverage of an FM stereo station. In this system, and as illustrated in FIG. 1, stereophonically-related audio frequency source signals L and R are matrixed to obtain stereophonic sum and difference signals M and S, respectively. At the transmitter, the difference signal is used to amplitude-modulate a first subcarrier signal and at the same time is applied to a compressor which compresses its dynamic range to produce a compressed difference S'. The compressed signal S' is used to amplitude-modulate a second subcarrier signal of the same frequency but in quadrature phase relationship with the first. Suppressed-carrier, double-sideband modulation is employed, with the frequency of the sub-carrier signal being sufficiently high to assure a frequency gap between the lower sidebands of the modulated sub-carrier signals and the M signal. A conventional low-level phase reference pilot signal, lying within the aforementioned frequency gap, is provided for detection purposes at the receiver. The M signal, the two modulated sub-carrier signals, and the pilot signal are frequency modulated onto a high frequency carrier for broadcast. The receiver includes a demodulator for deriving the M signal, the normal difference signal S and the compressed difference signal S', and an expander for expanding the derived compressed difference signal. The expanded noise-reduced version of the difference signal is combined with the received sum signal to obtain the original audio frequency source signals L and R. In addition to improving the quality of the received signal, the system increases the broadcast coverage area over that of current biphonic service.

Commonly assigned U.S. Pat. No. 4,602,381, the disclosure of which is hereby incorporated herein by reference, describes the use of the difference signal S as a reference for controlling the expansion of the received compressed difference signal S' so as to cause the amplitude of the expanded difference signal to equal the level of the uncompressed difference signal, making the expander pressed difference signal, making the expander adaptive to any compression characteristic that might be employed at the transmitter. This adaptive expander performs very well under stationary conditions, that is to say, when there is no relative movement of the receiver with respect to the transmitter.

However, in mobile applications, that is, with the receiver mounted in a moving vehicle and thus more prone to disturbances caused by the multipath propagation phenomenon, a condition in which a receiving antenna is sensitive to both a direct transmitted signal as well as to multiple, delayed reflections of that signal caused by terrain factors or man-made structures, the normal difference signal (L−R) may be adversely affected so as to no longer be suitable for controlling the expansion of the received compressed difference signal S'. Depending on delay intervals, multipath propagation can decrease the level of the received RF signal so as to cause noisy reception or complete signal dropouts. In conventional stereo receivers, the effect is characterized by momentary bursts of noise as the vehicle moves through the multipath space. In addition to this RF signal fading, the summation of the multipath signals at the receiver may also distort the phase relationship between the pilot signal and the stereo difference signal, and with the inclusion of the added compressed difference signal S', such momentary phase errors can result in momentary bursts of crosstalk as well as noise. Since the level of the compressed difference signal is generally higher than that of the normal difference signal, if the phase error is such as to cause crosstalk summation of the two stereo difference signals, loud bursts of sound may be heard. For these reasons, in the presence of multipath the resultant expanded difference signal will be corrupted by reason of its being controlled by a corrupt (L−R) reference signal.

A primary object of the present invention is to provide an improved receiver for an FM stereophonic broadcasting system incorporating companding of the difference signal which reduces the adverse effect of multipath disturbances on the reproduced stereo signal.

SUMMARY OF THE INVENTION

Briefly, the expander embodied in the receiver of the described FM stereophonic broadcasting system includes circuitry for preventing the normally expanded difference signal from being controlled by the uncompressed (L−R) reference signal during the occurrence of multipath disturbances which exceed a predetermined severity. This is accomplished by momentarily substituting a substantially fixed, or static, control voltage for the otherwise adaptive, or dynamic, control signal applied to the variable gain element of the expander during the relatively short period of the usual multipath disturbance, the amplitude of the static control voltage being based upon the last known correct dynamic control voltage. The substitution is effected by opening a normally closed switch in the control loop of the expander in response to detection in the receiver of multipath disturbances of a given severity, which may be done by detecting amplitude modulation occurring on the IF, the 19 kHz pilot, or fast AGC signals, or by detecting phase modulation of the pilot signal or an error in audio phase between the two difference channels, to remove the dynamic control and upon opening of the switch applying to the variable gain element a static voltage having an amplitude substantially equal to the amplitude the dynamic control signal had immediately prior to the opening of the switch. This momentary substitution does not seriously affect the reproduced signal, nor introduce any significantly perceptible stereo image shifts, because the period of the usual multipath disturbance is quite short relative to the rather slow changes involved in the dynamics of music.

According to another aspect of the invention, the amount or severity of multipath detected is translated into a DC voltage which is combined with the control signal for the variable gain element of the expander to provide a correction factor for minimizing the effects of multipath disturbances. Because the audio signal applied to the variable gain element (normally the sum of the stereo difference signal S and its compressed version S') is almost always greater in the presence of multipath than without, whether caused by intermodulation distortion noise or crosstalk additions, the correction signal is applied in a direction so as to further reduce the gain of the gain control element.

BRIEF DESCRIPTION OF THE DRAWINGS

Other objects, features and advantages of the invention, and a better understanding of its construction and operation, will be had from the following detailed description, when considered in conjunction with the accompanying drawings, in which:

FIG. 1, to which reference has already been made, is a frequency diagram of the composite baseband signal intended to be reproduced by the receiver of the invention;

FIG. 2 is a simplified block diagram of a receiver incorporating circuits according to one aspect of the invention for reducing the adverse effect of multipath disturbances.

DETAILED DESCRIPTION OF PREFERRED EMBODIMENTS

Figure 3:
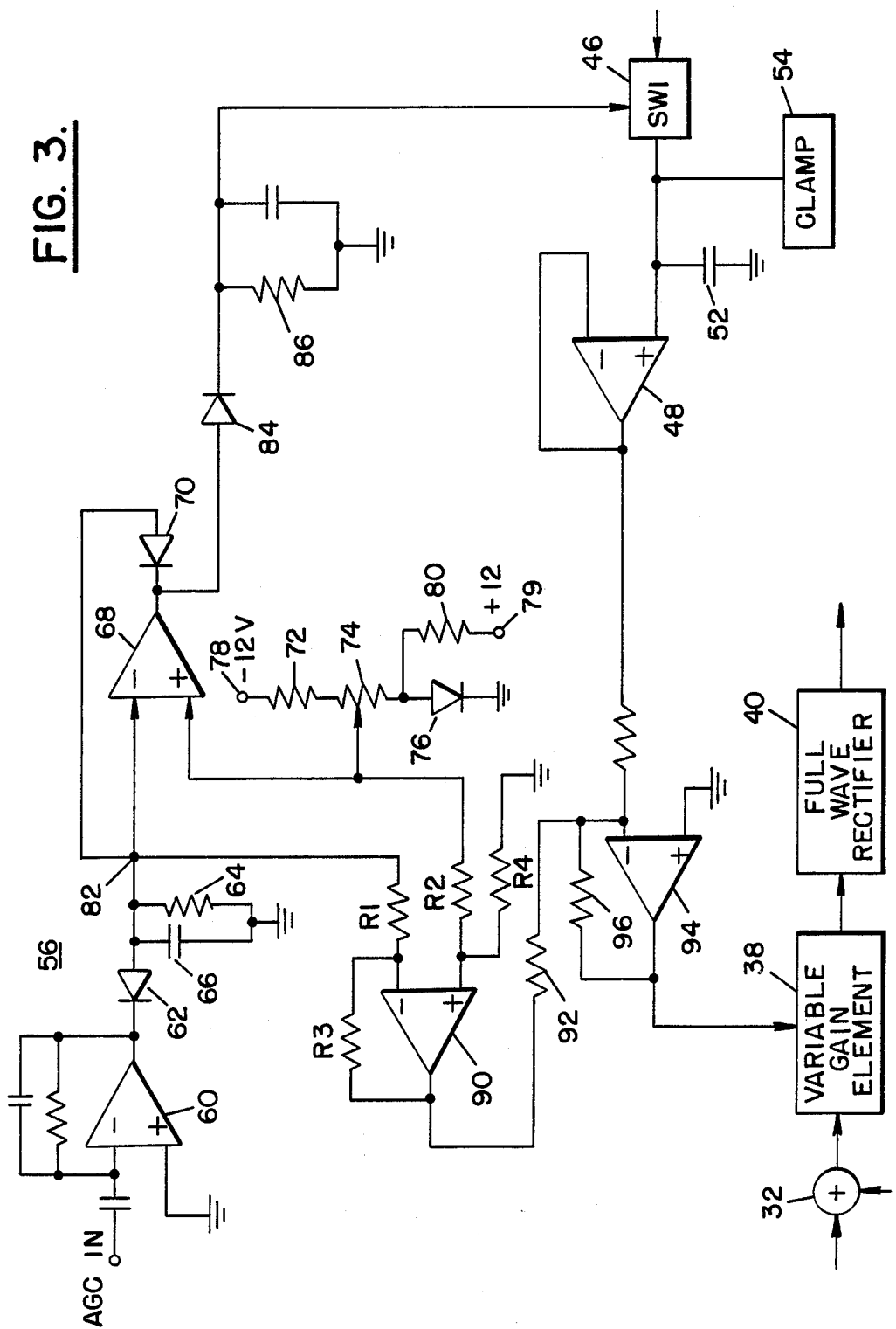
FIG. 3 is a partially block and partially schematic diagram illustrating a modification of a portion of the circuit of FIG. 2.

The FM sterophonic broadcasting system in which the receiver according to the invention is used is compatible with the existing two-channel stereo system approved by the FCC in that the transmitted signal has the baseband spectrum illustrated in FIG. 1 comprising a monophonic channel M from about 50 Hz to about 15 kHz, a 19 kHz pilot, and a stereophonic difference channel S from 23 kHz to 53 kHz. In common with the system described in U.S. Pat. No. 4,485,483, a compressed difference signal S' amplitude-modulated on a 38 kHz quadrature sub-carrier, is added to this otherwise conventional composite FM signal.

A receiver embodying the present invention is shown in the block diagram of FIG. 2 and, in the interest of simplicity, some of the more conventional FM receiver circuits (e.g., RF and IF stages and discriminator networks) have not been shown and will be only briefly mentioned as necessary. An FM signal received at an antenna 10 is amplified in conventional RF and detector stages 12 and IF stages 14, and demodulated in any of the known FM detection circuits (not shown) of an FM demodulator 16 to derive the signals contained in the received signal, namely, the signals M, S, S' and the pilot. The monophonic sum signal M is separated from the higher frequency components of the composite signal by a low-pass filter 18 and applied as one input to a conventional dematrix circuit 20. The remaining components of the composite signal are selected by a bandpass filter 22 designed to pass frequencies in the band from 19 kHz to 53 kHz and to reject frequencies below this band and applied to an S demodulator 24 and also to an S' demodulator 26. The pilot signal is derived by conventional means (not shown) and applied to a carrier generator 28 which regenerates quadrature versions of the pilot which are applied to demodulators 24 and 26, respectively.

As in the adaptive expander illustrated in FIG. 6 of the aforementioned U.S. Pat. No. 4,602,381, the uncompressed signal S from demodulator 24 is applied to a first full-wave rectifier 30 and is also applied as one input to an adder 32 in which it is preferably added to the compressed difference signal S' from demodulator 26. The direct current signal from rectifier 30, which has a level proportional to the amplitude of the difference signal S, is applied to one input of a comparator, such as a difference amplifier 34. The signal from adder 32, representing the sum of signals S and S', is applied to the input of a variable gain element 38, the output of which is applied to a second full-wave rectifier 40 which produces a direct current output signal having a level proportional to the amplitude of the output signal from variable gain element 38. This direct current signal is applied to the other input of difference amplifier 34. A reference voltage device 36, which may be embodied in rectifiers 30 and 40, establishes the lower knee, designated $V_1$ of the expander. Another voltage device 42 applies a low level gain signal, $V_2$, to amplifier 34 for insuring that the expander has a predetermined fixed gain reduction for signal levels falling below the knee of the expansion characteristic. Any output signal from the comparator representing a difference in the amplitude of the two applied signals (after taking into account the reference voltage levels established by elements 36 and 42), is applied to an integrator 44, preferably of the complex type described in U.S. Pat. No. 4,376,916, which includes a network of at least three signal paths having differing time constants, the network having a common input terminal for receiving the error signal from amplifier 34 and a common output terminal at which the control signal is developed. All except one of the signal paths each includes a diode for causing the respective path to be conductive only in response to the rectified signal exhibiting a change in amplitude sufficient to exceed a predetermined voltage, and the one signal path conducts in response to any differential in voltage between the input and output terminals. The output signal from integrator 44 is applied via a normally closed switch 46, designated SW1, to a suitable amplifier 48 which produces a control signal for application to the control element of variable gain element 38 to control the gain thereof.

One function of the difference amplifier 34 is analagous to that of the threshold level of conventional expanders in that no change is made to the voltage level determined by the uncompressed difference signal S until the signal level is above the knee of the transfer characteristic. As noted earlier, reference voltage $V_1$ establishes the lower knee of the expander as in conventional expanders. Above the threshold, difference amplifier 34 controls the gain of variable gain element 38 with a control signal proportional to the difference between the level of the compressed difference signal S' and the unchanged difference signal S. The output of variable gain element 38 is the signal S, except that it has been subjected to noise reduction by reason of the expansion of the compressed difference signal that takes place in the control loop. The signal S produced at the output of variable gain element 38 is applied via a switch 50 to the second input of dematrixer 20.

For enabling the receiver to reproduce a conventional two-channel stereo signal, the switch 50 is actuated, preferably automatically, from the position shown to the dotted line position so as to instead connect the output of demodulator 24 to the second input of dematrixer 20. The M signal derived from the conventional stereo signal, as before, is applied to the first input and combined with the S signal to produce output signals 2L and 2R, the amplitude of which is then reduced by one-half prior to application to left and right loudspeakers (not shown).

The level of the noise-reduced signal S appearing at the output of variable gain element 38 is set by the voltage reference device 42 and the difference between the signals from full-wave rectifiers 30 and 40 through amplifier 48 to be equal to the level of the received unchanged difference signal S and using that signal as a reference level gives the expander the advantage of being capable of adapting to any of a wide variety of companding laws. However, if the unchanged difference signal S is corrupted by disturbances such as carrier cancellation, intermodulation distortion or crosstalk from the compressed difference channel, caused by multipath, it is evident that the noise-reduced signal S will also be corrupted with the consequence that the original source signals L and R will not be acceptably reproduced.

In accordance with the present invention, the expanded signal appearing at the output of variable gain element 38 is prevented from following the uncompressed difference signal S during occurrence of multipath disturbances by temporarily substituting a static control voltage for the usual dynamic adaptive control signal for the variable gain element. This is achieved by the normally closed switch 46 connected in series between integrator 44 and buffer circuits including amplifier 48 and capacitor 50 and a clamp circuit 54, the latter two elements establishing, when switch 46 is opened, a static voltage level substantially equal to the level of the dynamic control voltage that existed at the instant of opening the switch. Switch 46 is controlled by a circuit for detecting the presence of multipath disturbances and may take the form of an amplitude modulation detector 56 for detecting amplitude modulation on the received signal which is available directly from the IF stages of the receiver, from the fast operating AGC normally present in FM receivers. The amplitude modulation is detected, rectified and amplified by a suitable amplifier 58 which, whenever the DC voltage exceeds an allowable limit of amplitude modulation, as established by a reference voltage $V_m$ applied to amplifier 58, applies a signal to and opens switch 46 to thereby interrupt the normal dynamic control signal for the variable gain element and replace it with a static DC control signal. When the multipath disturbance disappears, which is usually after a very short period, the extent of the amplitude modulation is no longer sufficient to cause the detector to deliver an enabling signal to switch 46 whereupon it automatically closes and dynamic control of variable gain element 38 is resumed.

FIG. 3 illustrates a specific embodiment of a detector for detecting amplitude modulation, and also circuitry for producing in response to detected amplitude modulation a signal for introducing a correction factor into the usual control signal for the variable gain element of the expander. More particularly, the varying DC voltage normally appearing on the automatic gain control line of the IF section is capacitively coupled to the negative input of an operational amplifier 60 whose positive input is connected to ground. Normally there is a certain amount of amplitude modulation present in the IF section which the circuit is designed to ignore, but instantaneous changes in level of the voltage on the AGC line is interpreted as a multipath disturbance on an instantaneous basis and is manifested by an increase in the level of the signal appearing at the output of operational amplifier 60. As was indicated earlier, multipath disturbances can be caused by a variety of factors, among them because the conventional difference signal and the compressed difference signal are on quadrature-related carriers, changes in the phase relationship between the 19 kHz pilot and the quadrature 38 kHz sub-carriers caused by multipath are non-linear, raising the possibility that there will be be some crosstalk between the normal difference signal and the compressed difference signal with the consequence that the signal applied to the variable gain element is larger than would be correct under the same conditions without multipath. An amplifier 68 recognizes the presence of multipath in excess of a predetermined tolerance level, and the circuitry associated therewith determines the severity of the multipath and establishes as a first order approximation the amplitude of the correction signal that should be added to the control signal for the variable gain element so as to minimize the audible effect of multipath. If the multipath occurrence or disturbance is minor or light the amount of change in the level of the control signal would be less than the change required under a more severe multipath condition.

Returning now to the detailed circuit of FIG. 3, the output signal from operational amplifier 60 is rectified by a diode 62 and a smoothing circuit consisting of a resistor 64 and a capacitor 66 connected in parallel from the cathode of the diode to ground, and then applied to the negative input of operational amplifier 68, the output terminal of which is connected through a diode 70 to the negative input terminal. The circuit allows negative-going pulses to appear at the output terminal of amplifier 68. Diode 70 is provided to insure that the circuit does not respond to any and all fluctuations that normally occur in mobile radio situations, the level above which the circuit will operate being determined by a voltage divider network comprising a resistor 72, a potentiometer 74, a diode 76 connected in series between a source 78 of negative potential and ground, and a resistor 80 connected from the junction of resistor 74 and diode 76 to a source 79 of positive potential. The wiper of potentiometer 74 is connected to and establishes a bias at the positive input port of operational amplifier 68, which because of the way an operational amplifier works, also appears at the negative input port. Thus, any signal applied to operational amplifier 68 that goes more positive than the bias established by potentiometer 74 will be clamped by diode 70 connected between the negative input and output of the amplifier. That is to say, when the voltage at a test point 82 goes more positive than it should, operational amplifier 68 functions as a comparator and causes its output to go very negative, which, in turn, causes diode 70 to conduct and clamp the voltage at the negative input port to be the same as that at the positive input port. If, however, the voltage at test point 82 goes more negative than is allowable, the positive input port is more positive than the negative input port, causing the output of the operational amplifier to go very positive; this positive-going information is coupled through a diode 84 and a time constant circuit 86 as a trigger to open switch 46. When switch 46 closes at the termination of the disturbance the charge on the time constant circuit capacitor decays away through the resistor with a time constant set by the resistor and capacitor values.

The just-described circuit in addition to providing digital information for turning switch 46 on and off upon occurrence of multipath disturbances in excess of a predetermined severity, also provides analog information for adding a correction factor to the fixed control voltage applied to variable gain element 38 during periods when switch 46 is open. This is accomplished by connecting the negative and positive input ports of operational amplifier 68 through equal-valued resistors R1 and R2 to the negative and positive input ports, respectively, of an operational amplifier 90 whose negative and positive input ports are respectively connected to the output port and to ground via resistors R3 and R4 having the same values as resistors R1 and R2. Thus, the reference voltage established by potentiometer 74 is applied to the positive input port and the voltage appearing at test point 82 is applied to the negative input port, and by reason of the described connections operational amplifier 90 functions as a subtractor circuit. In the absence of multipath disturbances the reference potential and the potential at test point 82 are equal with the result that the output from operational amplifier 90 theoretically will be zero. Recalling that the voltage at test point 82 goes negative with respect to the reference potential in the presence of multipath, becoming more negative in proportion to the severity of the multipath disturbance, the output of operational amplifier 90 is a positive voltage having a value directly proportional to the severity of the disturbance. This positive voltage is used as a correction factor for the otherwise fixed control voltage for the variable gain element and is applied via a resistor 92 to the negative input port of an operational amplifier 94 connected in series with amplifier 48 in the control loop of variable gain element 38, the relative values of resistor 92 and the feedback resistor 96 establishing a weighting factor which determines how much of the voltage developed at the output of operational amplifier 90 is added to the control voltage. It is seen that operational amplifier 68 and its associated circuitry acts as a clamp which prevents the application of any correction when there is no multipath disturbance or a slight amount that may be ignored, but when a multipath disturbance exceeding a predetermined threshold of severity occurs, it opens switch 46 and also applies a correction factor to the now fixed control voltage which is directly proportional to the multipath.

It will be understood that the described concepts of replacing the usually dynamic control signal with a substantially fixed control voltage and applying a correction factor to this fixed control voltage upon detection of multipath exceeding a predetermined severity can be embodied in either of the three general types of adaptive expander described in U.S. Pat. No. 4,602,381. Also, although specific embodiments of the invention have been illustrated and described, they are exemplary only, and such variations and modifications as will now be suggested to those skilled in the art will be understood as forming a part of the present invention insofar as they fall within the spirit and scope of the appended claims. For example, although FIG. 3 illustrates detection of multipath on the AGC line in the FM receiver, it is within the contemplation of the invention to utilize any of a wide variety of available techniques for detecting changes in the operation of the receiver indicative of multipath and its severity additionally including detection of amplitude modulation occurring on the 19 kHz pilot signal, detection of phase modulation of the pilot signal, or detection of errors in audio phase between the two difference channels.

I claim:

1. In a receiver for an FM stereophonic broadcasting system adapted to receive a composite FM stereo signal and to derive therefrom a sum signal, a stereo difference signal S and a compressed version S' of said stereo difference signal, said receiver including
   an IF stage, an adaptive expander for producing a noise-reduced stereo difference signal comprising an electronically controllable variable gain element connected to receive at least said signal S', and control signal generating means for generating a control signal responsively to at least said signal S and normally applying said control signal to said variable gain element for causing the gain thereof to follow dynamic variations in the amplitude of said signal S, and means for reproducing a combination of said derived sum signal and said noise reduced stereo difference signal,
   circuit means responsive to detection of the presence of multipath disturbances for momentarily applying a static control voltage, instead of said control signal, to said variable gain element for controlling the gain thereof during periods of occurrence of detected multipath disturbances in excess of a predetermined severity.

2. Receiver apparatus according to claim 1, wherein said circuit means includes
   a normally closed switch in the control signal generating means for said variable gain element adapted to be opened responsively to the detection of multipath disturbances in excess of a predetermined severity, and
   means connected to said control signal generating means and operative upon the opening of said switch to apply to said variable gain element a control voltage having an amplitude substantially equal to the amplitude said control signal had immediately prior to the opening of said switch.

3. Receiver apparatus according to claim 2, wherein said circuit means further comprises:
   detector means connected to said receiver responsive to changes in a parameter of said FM stereo signal which exceed a predetermined threshold for producing a signal for opening said switch.

4. Receiver apparatus according to claim 3, wherein said detector means comprises:
   circuit means including a rectifier for developing a direct current voltage having a level proportional to the degree of said changes in said parameter of said FM stereo signal, and
   means for comparing said direct current voltage against a controllable reference voltage and for applying an actuating signal to said switch to open the same when said direct current voltage exceeds said reference voltage.

5. Receiver apparatus according to claim 4, wherein said circuit means further comprises:
   operational amplifier means connected to receive as inputs said direct current voltage and said reference voltage and having its output applied to the control signal generating means for said variable gain element for adding to said control voltage a correction factor which is proportional to the level of said direct current voltage.

6. Receiver apparatus according to claim 2, wherein said circuit means further comprises:
   detector means connected to said receiver responsive to amplitude modulation of a component of the received composite signal in excess of a predetermined threshold level for producing a signal for opening said switch.

7. Receiver apparatus according to claim 6 wherein said detector means is connected to an IF stage of said receiver and is responsive to amplitude modulation of the IF signal.

8. Receiver apparatus according to claim 6, wherein said detector means comprises:

circuit means including rectifier means for developing a direct current voltage having a level proportional to the amount of amplitude modulation of said component of the received signal, and means for comparing said direct current voltage against a settable reference voltage and for applying an actuating signal to said switch for opening the same when said direct current voltage exceeds said reference voltage.

9. Receiver apparatus according to claim 7 wherein said detector means comprises:

circuit means including rectifier means for developing a direct current voltage having a level proportional to the amount of amplitude modulation of the IF signal, and means for comparing said direct current voltage against a settable reference voltage and for applying an actuating signal to said switch for opening the same when said direct current voltage exceeds said reference voltage.

10. Receiver apparatus according to claim 8, wherein said circuit means further comprises:

operational amplifier means connected to receive as inputs said direct current voltage and said reference voltage and having its output applied to the control voltage generating means for said variable gain element for adding to said control voltage during periods when said switch is open a correction factor which is proportional to the level of said direct current voltage.

11. Receiver apparatus according to claim 9, wherein said circuit means further comprises:

operational amplifier means connected to receive said direct current voltage and said reference voltage as inputs and for applying a correction voltage to said control voltage for said variable gain element during periods when said switch is open which is proportional to the level of said direct current voltage.

* * * * *